United States Patent Office 2,832,997
Patented May 6, 1958

2,832,997

POROUS SHEET MATERIAL

Kenneth E. Bristol, Akron, Ohio, assignor, by mesne assignments, to The Goodyear Tire & Rubber Company, a corporation of Ohio No Drawing. Application September 24, 1953
Serial No. 382,185

5 Claims. (Cl. 18—53)

This invention relates to a substitute for leather and to a process for manufacturing the leather substitute from a foamed latex and a fibrous material distributed in random arrangement throughout the foam.

It is an object of this invention to produce a substitute for leather having the desirable properties of leather.

Another object of this invention is to provide a process for producing the leather substitute of this invention, with process comprises forming a frothed latex containing fibrous material, compacting and vulcanizing the frothed latex into the product of this invention.

It has been discovered that the desirable properties of leather can be reproduced if relatively large amounts of a fibrous material are distributed evenly and in random arrangement into sheet form using rubber as the bonding agent. This is difficult to do, particularly when working with masticated rubber. Difficulties are also encountered when working with rubber latex.

It has now been discovered that relatively large amounts of fibrous material may be evenly distributed in random arrangement in a sheet of rubber by dispersing the fibrous material into a rubber latex which has been processed to occupy a relatively large volume of space per unit weight of latex, thus permitting distribution of the relatively large amount of fibrous material in not only two dimensions but also a relatively large third dimension. The increase in volume occupied by the rubber latex is brought about by foaming with a gas, such as air, in accordance with methods well known in the latex foamed rubber industry. After the fibrous material has been evenly distributed throughout the frothed rubber latex, the resulting mixture is spread into a sheet of even gauge, gelled, washed, and then crushed or compressed to a desired density or porosity, dried, and then vulcanized and further crushed during vulcanization to a desired state of vulcanization and to a final desired density. The gelled latex sheet may also be dried and crushed to a final porosity during vulcanization. It is preferred to partially crush the foamed sheet before it is crushed to its final density during or just before vulcanization.

The resulting sheet of fibrous material has the desirable properties of leather, particularly with regard to porosity or permeability to water vapor. The permeability to water vapor (MVTR) of the leather-like sheet may range anywhere from zero up to 50 grams per 100 sq. in. for 24 hours, measured at an 85% humidity differential at 77° F.

The permeability to water vapor of the leather-like sheet is dependent upon the final degree to which the gelled rubber latex foam has been compacted or crushed. The gelled rubber latex foam may be crushed anywhere from about 10 to about 96% of its original volume. The degree of porosity possessed by the foam after it has been crushed will depend, of course, upon the initial specific gravity of the rubber latex foam being crushed, which may range from about .05 to about 0.5. In crushing the gelled foam in this way, the specific gravity is increased to a value approaching 1.0 which represents a percentage increase ranging from 100 to 2000. Likewise, the space initially occupied by the air which may range anywhere from about 50 to 95% of the total volume occupied by the gelled foam will be reduced to a space ranging anywhere from about 0 to 30% based on the total volume occupied by the crushed sheet.

In general, it is desirable to crush the latex foam to such a degree that the finished sheet has a MVTR ranging from 25 to 40 grams, a gravity ranging from .6 to 1.0, a void space ranging from 5 to 30%, and a volume ranging from about 4 to about 10% of the original volume.

Fibrous material in general may be used in the process of this invention, and particularly cotton fibers ranging in length from 1/16" to 3/8" may be used in amount from about 10 parts to about 30 parts per 100 parts of latex. It has been discovered that when greater than 30 parts of these cotton fibers are added, further improvement in tensile and resistance to tear of the fibrous sheet fails to show up. Tear strength values as high as 17 pounds have been developed for the fibrous sheet made in accordance with this invention, having a thickness of .040". The same sheet developed a modulus of 160 pounds per square inch at 2% elongation, and 305 pounds per square inch at 5% elongation. Thus, in accordance with the process of this invention, fibrous sheet can be made which has the properties of leather, particularly with regard to porosity as well as tear, and has modulus properties that are better than those of leather.

It is desirable to use fibrous material of as long a length as may be dispersible in the rubber latex. It has been found that in addition to short cotton fibers of a length ranging from 1/16 of an inch to 3/8 of an inch, short strings or yarns made of cotton fibers may also be used and which may range in length from 1/16 of an inch up to .5 of an inch without causing any difficulty during the dispersing operation. Greater than 30 parts may be used when working with strings or yarn.

The fibrous material may be added before, during or after frothing. However, it is found more desirable to add the fibrous material to the rubber latex during the frothing operation because the stirring and wiping action used to froth the latex also acts to disperse the fibrous material evenly throughout the foamed latex.

Generally the leather substitute of this invention may be made by first compounding a rubber latex, either natural rubber or synthetic rubber such as GR–S, neoprene, or polybutadiene, with conventional rubber latex compounding ingredients, and then frothing the compounded latex to the desired density. The fibrous material is added during the frothing operation and then the gellant materials are added and the mixture spread upon a suitable casting surface, such as an endless belt, into a sheet of any desired thickness depending upon the density of the frothed rubber and the thickness desired in the finished sheet, by passing the frothed latex under a spreader knife. The frothed latex sheet is then gelled, washed, and then partially crushed to a thickness of about 1/8 of an inch. It is desirable to only partially crush the sheet of gelled rubber latex foam in order to facilitate drying. After the sheet has been partially crushed and before it has been dried, any desirable coating may be applied to the sheet of rubber latex foam. For example, a solution of nylon in alcohol may be applied to the surface of the wet, partially crushed sheet and then permitted to set along with the drying of the foam, after which the dried, partially crushed sheet is then further crushed during curing under a pressure of from 10 pounds to 300 pounds, depending upon the porosity desired in the finished sheet, and preferably from 20 to 50 pounds per square inch and at a suitable curing temperature, generally from about 290° F. to about 320° F., for a time sufficient to bring about the desired state of cure.

The nylon coating may also be applied after the partially crushed sheet has been dried, and partially cured. The partially cured nylon coated sheet is then completely cured under the conditions referred to above. The nylon coat may also be applied to the partially crushed and dried sheet prior to any cure.

Another method of coating the fibrous sheeting of this invention is to apply a primer coat to the partially compacted sheet prior to curing, then cure the primer coated sheet under a pressure sufficient to further compact the sheet, then apply conventional leather finish coating materials to the surface of the cured primer coated sheet using such materials as pigmented or clear aqueous or solvent dispersions of acrylate, nitrocellulose or vinyl resins.

Uncoated fibrous sheeting as prepared in accordance with the process of this invention as outlined above has a moisture vapor transfer rate of 38 grams per 100 square inches per 24 hours at an 85% humidity differential measured at 77° F. When the sheeting has a double nylon coating, the moisture vapor transfer rate is from 8 to 9 grams.

The following example illustrates how the invention may be practiced. All parts here and throughout the specification are by weight unless otherwise indicated.

*Example*

The rubber latex used as a binder for making the fibrous sheeting of this invention had the following composition, based on dry weight:

| | Parts |
|---|---|
| Natural rubber latex (60% solids) | 100 |
| Sulfur | 1.4 |
| Zenite (zinc salt of mercaptobenzothiazole) | 0.6 |
| Antioxidant A | 1.5 |
| Potassium oleate | 2.4 |

The rubber latex was compounded by stirring into the latex the potassium oleate made up as a 20% water solution. The sulfur, Zenite, and antioxidant A were added as 50% water dispersions. The sulfur is the primary vulcanization agent. Zenite is the vulcanization accelerator. Antioxidant A is a commercial non-staining antioxidant comprising a mixture of alkylated phenols, and inhibits oxidation of the finished product. The potassium oleate is the frothing agent and froth stabilizer. A reinforcing resin in amount from about 10 to about 25 parts may be added to the natural rubber latex which resin tends to reduce the rubbery feel of the sheeting. The resins preferred are those resulting from the polymerization of a conjugated diene monomer, such as butadiene-1,3, with a vinyl aromatic monomer, such as styrene, in which the styrene is present in amount above about 70 parts to about 95 parts per 100 parts of both monomers, and preferably 85 to 90 parts of styrene.

Three hundred parts of the mix, based upon volume of the compounded rubber latex described above, were placed into a bowl and frothed by beating air into the latex with a wire whip until the mix occupied a volume of 3600 parts. Twenty parts of cotton linters having an average fiber length of 1/8 of an inch were slowly added during frothing until substantially evenly distributed. The finishing ingredients were then added, including 3 parts of zinc oxide as a 50% water dispersion, which was stirred into the froth for 1 minute and 1.0 part of sodium silico fluoride was added as a 20% water dispersion over a period of 1 minute. The froth was then poured onto a traveling endless belt and spread to a gauge of 3/4 of an inch by means of a spreader knife. The latex binder for the sheet became gelled after 5 minutes. The resulting sheet was washed in water by immersion and then passed through a pair of compression rollers set to a bite of 1/8". The crushed sheet was then dried for 1/2 hour at 220° F. and then press-cured for 10 minutes, at 290° F., under a pressure of 50 pounds per square inch.

The resulting sheet was .040" thick, had a tear strength of 17 pounds in any direction, a water vapor transfer rate of 12 grams per 100 square inches for 24 hours, measured at 85% humidity differential and 77° F., and developed a modulus of 160 pounds at 2% elongation and 305 pounds at 5% elongation, a gravity of 0.95, and contained 6% air.

The leather-like sheet material of this invention may be used in making shoe uppers in place of natural leather; as upholstery material in the manufacture of furniture, particularly chairs and davenports; and in the manufacture of brief cases, and luggage of all types.

Although rubber latex is preferred as the binder and dispersion medium, in carrying out the process of this invention, other latices capable of being frothed to increase the volume of the latex and then gelled may be used, including plastic latices of all types. The ability to convert the latex into a froth permits the use of relatively large amounts of the fibrous material to be dispersed in the froth and also permits the dispersion of the fibrous material evenly throughout the froth in random arrangement. The addition of the fibrous material to the froth reduces the tendency of the fibers to clot. The latex foam mix containing the fibrous material is porous when dry and by proper adjustment of pressure during the crushing period this porosity can be reduced to the desired amount or eliminated. During the cure of the crushed sheet under pressure, a smooth or grained surface can be molded thereon.

The process of this invention may be carried out continuously from the time the latex is compounded, frothed, spread, gelled, washed, crushed, and vulcanized until a sheet of uniform density having the appearance and physical properties similar to leather is produced.

While certain representative embodiments and details have been shown for the purpose of illustrating the invention, it will be apparent to those skilled in this art that various changes and modifications may be made therein without departing from the spirit or scope of the invention.

I claim:

1. A process for manufacturing porous fibrous sheeting of substantially uniform thickness which comprises forming a layer of frothed gellable latex containing fibrous material uniformly distributed throughout the froth, gelling the layer of froth, partially compressing the layer of gelled frothed latex to increase its density, and curing the partially compressed layer under pressure sufficient to further compress the layer into a vulcanized fibrous sheeting having a moisture vapor transfer rate of from about 25 to about 40 grams per 100 square inches per 24 hours measured at an 85% humidity differential at 77° F.

2. The process of claim 1 in which rubber latex is used as the gellable latex.

3. The process of claim 1 in which natural rubber is used as the gellable latex.

4. As an article of manufacture, substantially even-gauge moisture vapor pervious vulcanized rubber sheeting of thin flexible compressed and cured foamed rubber latex containing cotton linters uniformly distributed throughout the sheeting in bonded relationship with the cured latex and being present in such an amount as to impart to the sheeting a moisture vapor transfer rate of from about 25 to about 40 grams per 100 square inches per 24 hours measured at an 85% humidity differential at 77° F.

5. As an article of manufacture substantially even gauge moisture vapor pervious vulcanized rubber sheeting of thin flexible compressed and cured foamed rubber latex containing fibrous linters uniformly distributed throughout the sheet in bonded relationship with the cured latex and being present in an amount from about 10 to about 30 parts per 100 parts by weight of rubber and being mostly of a fiber length of from about 1/16" to about 3/8" and the sheeting having a moisture vapor transfer rate of from about 25 to about 40 grams per 100 square inches per 24 hours measured at an 85% humidity differential at 77° F.

References Cited in the file of this patent

UNITED STATES PATENTS

| | | |
|---|---|---|
| 38,813 | Davis | June 9, 1863 |
| 1,945,055 | Madge | Jan. 30, 1934 |
| 2,039,529 | Guinzburg | May 5, 1936 |
| 2,161,308 | Murphy et al. | June 6, 1939 |
| 2,336,944 | Madge | Dec. 14, 1943 |
| 2,512,464 | Mann | June 20, 1950 |
| 2,517,724 | Schuh | Aug. 8, 1950 |
| 2,568,866 | Osterhof et al. | Sept. 25, 1951 |

OTHER REFERENCES

Bennett et al.: India Rubber World, Sept., 1950, p. 672, Publisher: Bill Bros. Pub. Corp., etc., N. Y., U. S. Patent Office Scientific Library, TS 1870, 144.